United States Patent [19]

Duncan

[11] Patent Number: 4,521,374
[45] Date of Patent: Jun. 4, 1985

[54] FUEL GRID WITH SLEEVES WELDED IN NOTCHED GRID STRAPS

[75] Inventor: Robert Duncan, Columbia, S.C.

[73] Assignee: Westinghouse Electric Corp., Pittsburgh, Pa.

[21] Appl. No.: 414,232

[22] Filed: Sep. 1, 1982

[51] Int. Cl.³ .............................................. G21C 3/34
[52] U.S. Cl. ................................... 376/462; 376/353; 376/449; 376/446; 211/72
[58] Field of Search ............... 376/438, 441, 462, 442, 376/353, 449, 434, 446; 29/723, 400 N, 419; 248/68.1; 211/60 R, 72; 403/271; 52/664–669

[56] References Cited

U.S. PATENT DOCUMENTS

| | | | |
|---|---|---|---|
| 3,791,466 | 2/1974 | Patterson et al. | 376/442 X |
| 3,862,884 | 1/1975 | Jabsen | 376/446 X |
| 3,920,516 | 11/1975 | Kmonk et al. | 376/442 X |
| 3,984,284 | 10/1976 | Long et al. | 376/442 |
| 4,081,324 | 3/1978 | Flora et al. | 376/442 X |
| 4,119,490 | 10/1978 | Delafosse | 376/449 X |
| 4,124,443 | 11/1978 | Bezold | 376/449 X |
| 4,175,004 | 11/1979 | Jabsen | 376/441 |
| 4,221,636 | 9/1980 | Feutrel | 376/441 |
| 4,239,597 | 12/1980 | Christiansen | 376/442 X |
| 4,294,660 | 10/1981 | Christiansen | 376/442 |

Primary Examiner—Richard E. Schafer
Assistant Examiner—Daniel Wasil
Attorney, Agent, or Firm—Douglas E. Erickson

[57] ABSTRACT

A grid of a fuel assembly structure for a nuclear reactor comprises two sets of uniformly spaced straps perpendicular to each other for receiving and supporting cylindrical sleeves. The straps forming cells which receive the sleeves have notches at their edges, and the sleeves are joined to the straps by lap welding at the notches.

3 Claims, 5 Drawing Figures

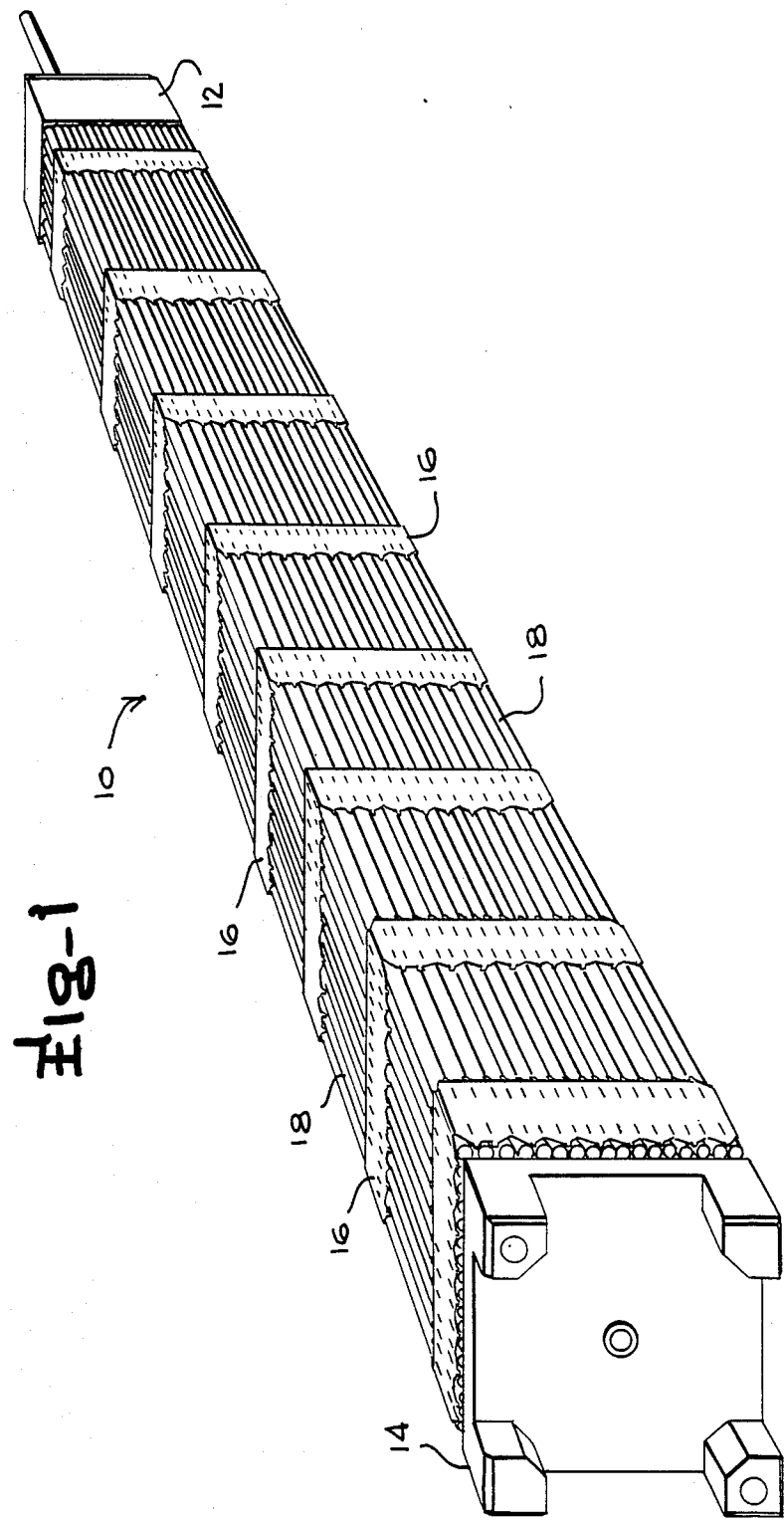

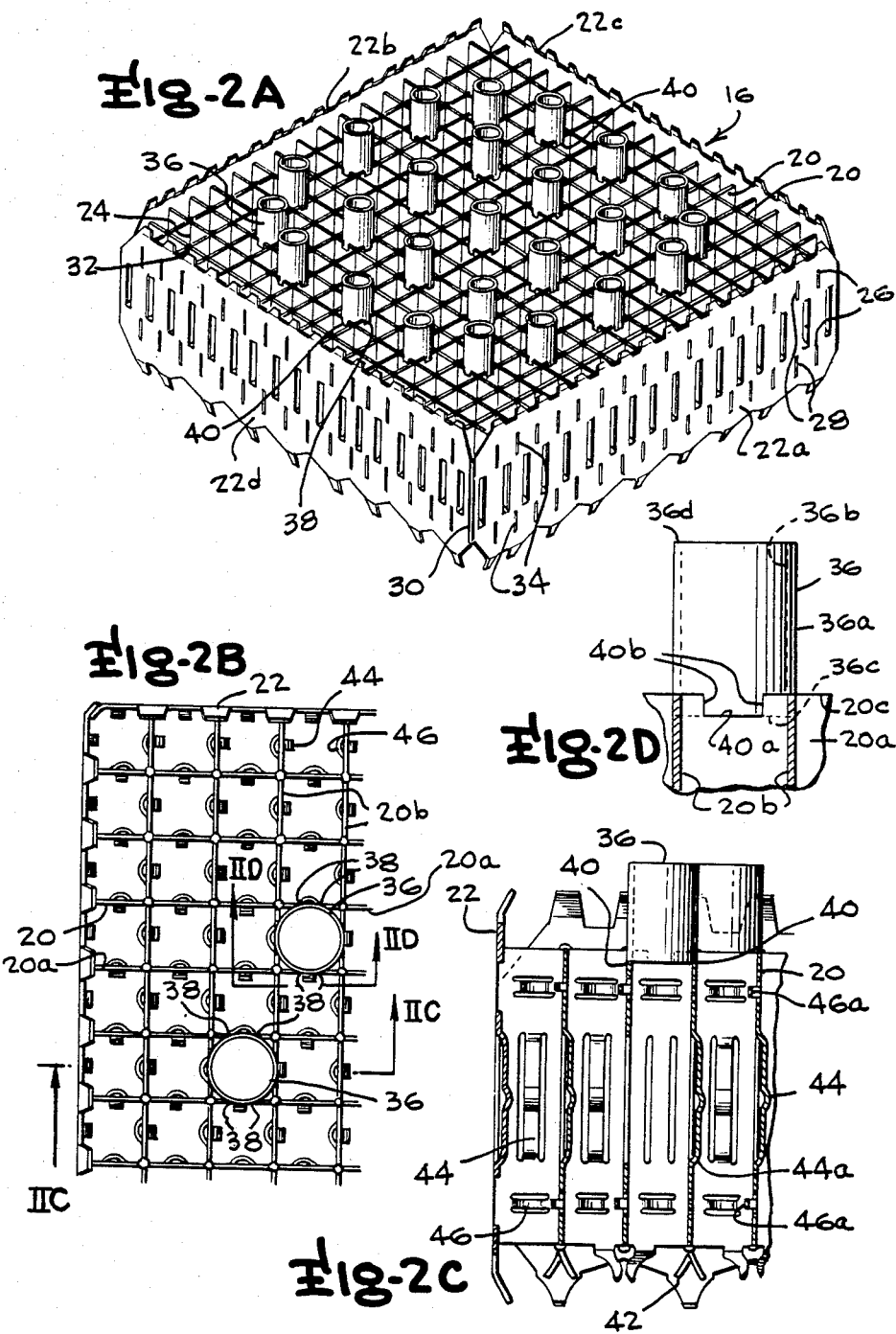

4,521,374

FUEL GRID WITH SLEEVES WELDED IN NOTCHED GRID STRAPS

CROSS-REFERENCE TO COPENDING APPLICATIONS

Attention is drawn to the following copending, commonly assigned applications, all/each filed on even date and incorporated specifically by reference into the instant specification:

(1) "PULSED LASER MACHINING APPARATUS" by R. A. Miller and G. D. Bucher, Ser. No. 414,264 filed 9/1/82;

(2) "APPARATUS AND METHOD FOR LASER MACHINING IN NON-REACTIVE ENVIRONMENT" by R. A. Miller and G. G. Lessman, Ser. No. 414,242 filed 9/1/82;

(3) "STRAP AND VANE POSITIONING FIXTURE FOR FUEL ROD GRID AND METHOD" by R. F. Antol, R. W. Kalkbrenner and R. M. Kobuck, Ser. No. 414,197 filed 9/1/82;

(4) "GRID ASSEMBLY FIXTURE, RETENTION STRAP AND METHOD" by R. M. Kobuck and R. W. Kalkbrenner, Ser. No. 414,198 filed 9/1/82;

(5) "LASER MACHINING SYSTEM" by D. L. Wolfe, J. W. Clements and J. S. Kerrey, Ser. No. 414,241 filed 9/1/82;

(6) "MOVABLE MACHINING CHAMBER WITH ROTATABLE WORK PIECE FIXTURE" (Westinghouse Case No. 49,938), by R. F. Antol, R. Kalkbrenner and D. L. Wolfe, Ser. No. 414,263 filed 9/1/82;

(7) "WORKPIECE GRIPPING AND MANIPULATING APPARATUS FOR LASER WELDING SYSTEMS AND THE LIKE" by R. Kalkbrenner and R. Kobuck, Ser. No. 414,262 filed 9/1/82;

(8) "LASER LENS AND LIGHT ASSEMBLY" by R. Antol, R. Kalkbrenner and R. Kobuck, Ser. No. 414,205 filed 9/1/82;

(9) "WELDING PLATES FOR A FUEL ROD GRID" by R. M. Kobuck, R. Miller, R. W. Kalkbrenner, J. Kerrey and R. Duncan, Ser. No. 414,265 filed 9/1/82;

(10) "PLURAL COMPUTER CONTROL FOR SHARED LASER MACHINING" by J. W. Clements and W. D. Lanyi, Ser. No. 414,204 filed 9/1/82;

(11) "GRID AND SLEEVES WELDING FIXTURE AND METHOD" by J. S. Kerrey and R. Duncan, Ser. No. 414,203 filed 9/1/82;

(12) "CALIBRATION OF AUTOMATED LASER MACHINING APPARATUS" J. W. Clements and J. R. Faulkner, Ser. No. 414,272 filed 9/1/82; and

(13) "RIGID SUPPORT FOR LASER MACHINING APPARATUS" (Westinghouse Case No. 50,530), by D. L. Wolfe, Ser. No. 414,191 filed 9/1/82.

BACKGROUND OF THE INVENTION

Description of the Prior Art

This invention, in its preferred form, relates to a fuel grid assembly having sleeves welded to it. More particularly, the invention relates to such an assembly in which the grid straps forming certain of the cells are provided with notches, and a cylindrical sleeve is seated in the notches.

There have been provided nuclear fuel bundle assemblies which include a matrix of nuclear fuel rods which are arrayed in rows and columns, and held in such configuration by a plurality of fuel rod grids. These grids are formed of straps which are slotted, so that the straps mate, one strap entering into the slot of the other strap at each point of intersection. Control rods are included at selected positions within the array of nuclear fuel rods. These control rods are received in guide sleeves which are welded to the grid. More particularly, there has been provided in the past a construction in which the straps forming the grid had edges which were substantially in a common plane, and a plurality of guide sleeves were provided, each seated on four straps defining a common cell. The outside diameter of the cylindrical guide sleeve was such as to permit the base of the cylindrical guide sleeve to rest upon the edges of four straps forming a single cell, it being understood that guide sleeves were provided only at spaced cells, and not at adjacent cells.

To assemble the guide sleeve to the grid, the guide sleeves were butt welded onto the straps forming the particular cell at the upper edge of each of the four straps. This procedure required that the grid, after assembly, be machined to insure that the edges of the four straps forming the particular cell to which the cylindrical sleeve was to be welded lay as closely as possible in a common plane, and this required a fabrication step known as "spot facing". The "spot facing" step was time consuming and costly, requiring the use of a suitable machine and fixtures, as well as the expenditure of a workman's time. The requirement for relatively great precision in the location of the strap edges is based on the fact that if a gap greater than 0.005 inches remains between the sleeve and the edge of the grid strap, the weld which is effected may well be defective, in that the fused metal will not extend entirely beneath that portion of the base of the cylindrical sleeve which is intended to engage the upper edge of the grid strap; the occurrence of a gap will result in either lack of welding or no welding, either of which is unsatisfactory.

Another construction of a sleeve and grid assembly is shown in Patterson et al. U.S. Pat. No. 3,791,466 which shows a grid assembly including sleeves of the same general type as above referred to, the sleeves being brazed to the straps forming the grid.

SUMMARY OF THE INVENTION

It is therefore an object of this invention to provide a construction for a grid and sleeves secured thereto wherein engagement is achieved between the cylindrical sleeve and the grid without the necessity for expensive "spot facing" and similar operations.

It is a more specific object to provide a grid and cylindrical sleeves construction in which location of the sleeve relative to the grid is more readily achieved, in which the welding time is reduced, in which rejection because of defective welding of an entire grid assembly is reduced, and in which tolerances need not be as close as in previously utilized constructions.

In accordance with these and other objects of the invention, there is disclosed a fuel grid assembly made up of mating straps which are punched from a continuous strip of material, the straps having slots therein. The assembled grid of mating slotted straps thereby has a large number of cells, each defined by four straps. There are two sets of straps, the straps of each set being uniformly spaced and parallel, and the straps of one set being perpendicular to the straps of the other set. Further, the spacing of the straps of the two sets is the same, so that the cells are square. Certain of the cells have notches in the four straps which define and form the cell, in the upper edge thereof, each notch being rectangular, with one edge thereof parallel to the edge of the strap, and a pair of edges perpendicular thereto. The notches are each located centrally along that portion of the strap extending between the two perpendicular straps which are next adjacent to it. The cylindrical sleeve is seated in the four notches formed in the four straps defining the cell, the outer diameter of the cylindrical sleeve being substantially the same as the distance between the outside surfaces of the four straps forming the cell; the bottom or base of the cylindrical sleeve engages the edge of each notch which is parallel to the edge of the strap of which it forms a part, and also substantially engages the two edges perpendicular thereto. The cylindrical sleeve thus has an interference fit with the seat formed by the four notches. Welding is achieved by welding the pair of edges and the cylindrical sleeve of one notch, and the pair of edges and cylindrical sleeve of the diametrically opposite notch.

In practice, if it is determined, after the initial welding, as by laser welding, of the cylindrical sleeve and oppositely disposed strap notch edges, that the welding is defective, there may be welded the cylindrical sleeve to the strap notch edges of the two straps which are perpendicular to the straps of the initial welding, thereby accomplishing a suitable welding in a facile manner, and without extensive reprocessing of the grid.

BRIEF DESCRIPTION OF THE DRAWINGS

A detailed description of the preferred embodiment of this invention is hereafter made with specific reference being made to the drawings in which:

FIG. 1 is a perspective view of a nuclear fuel bundle assembly;

FIG. 2A is a perspective view of a grid, with sleeves thereon;

FIG. 2B is a plan view, showing a portion of the grid and several sleeves on an enlarged scale;

FIG. 2C is a cross-sectional view taken on the line 2C—2C of FIG. 2B; and

FIG. 2D is a cross-sectional view taken along the line 2D—2D of FIG. 2B.

DESCRIPTION OF THE PREFERRED EMBODIMENT

The apparatus and method of this invention are specifically designed as part of the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assembly 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and therefore, the orientation of the fuel rods 18 with respect to each other is rigorously controlled.

The present invention is, in one illustrative embodiment thereof, related to the manufacture of fuel rod grids 16 as shown in FIG. 2A. The fuel rod grid 16 is of an approximately square configuration whose periphery is formed by four outer grid straps 22a, 22b, 22c, and 22d. Each end of an outer grid strap 22 is welded by a corner seam weld 30 to the end of a perpendicularly disposed outer grid strap. Two sets of spaced, parallel inner grid straps 20 are provided, the straps of the sets being perpendicular to each other, whereby a plurality of square cells are formed to receive the control rods and the nuclear fuel rods 18. The inner grid straps 20 have mating slots therein providing points 24 of intersection. An intersect weld 32 is formed at each of the points 24 of intersection, whereby a rigid grid structure is formed. Further, each of the inner grid straps 20 includes at each end a pair of tabs 26 of a size and configuration to be tightly received in top and bottom slots 28 formed in the outer grid straps 22, as shown in FIG. 2A. A slot and tab weld 34 is effected along the top and bottom rows of slots 28 in the outer grid straps 22. Further, a plurality of guide sleeves 36 is disposed on the top-most surface of the fuel rod grid 16 to receive and guide the control rods disposed therein. A series of seam welds 38 securely attach the guide sleeves 36 to corresponding notches 40 formed within the inner grid straps 20. A precision laser welding apparatus is particularly adapted to perform a series of controlled welding operations whereby each of the welds 30, 32, 34, and 38 is carried out. The precision laser welding apparatus as described and claimed in Westinghouse Ser. Nos. 414,247 and 414,263 not only controls the various parameters of generating the laser in terms of the pulse width and pulse height of each laser pulse and the number of pulses to be applied to each weld, but also controls the sequential positioning of the fuel rod grids 16 with respect to the laser beam. It is understood that after each such weld, the fuel rod grid 16 is repositioned and/or the focal point of the laser beam changed to effect the particular type of weld desired.

FIG. 2B discloses a portion of the grid 16, showing two of the sleeves 36 joined to certain of the inner grid straps 20. FIG. 2C shows that there are provided, in each of the cells formed by four intersecting straps, resilient fingers 44 which have been stamped from the material of the straps during the operation which has formed the straps from a continuous strip of metal. In addition, there are provided, at the bottom of the grid 16 as shown in FIG. 2C, vanes 42 which extend from the various straps 20 and 22 and which lie at angles to the planes containing the straps from which they extend. Also provided are resilient spacing fingers 46.

In FIG. 2D there is shown, in detail, the specific grid and sleeve assembly in accordance with the present invention. The sleeve 36 is a right cylinder, having an outer cylindrical surface 36a, a concentric inner cylindrical surface 36b, and annular end faces 36c and 36d. A portion of an inner strap 20a is shown in elevation, and closely perpendicular thereto, and in spaced, closely parallel array are a pair of grid straps 20b, which are shown in cross section. As shown in FIG. 2B, the sets of parallel grid straps, which are uniformly spaced and in which the straps of one set are perpendicular to the straps of the other set, form a plurality of cells. Since the spacing of the straps are uniform, the cells are squares. Further, as shown in FIG. 2C, the upper edges of all of the straps lie substantially in a common plane.

Each of the straps 20a, 20b forming a cell with which a sleeve 36 is to be joined is provided with a rectangular notch 40 which is located centrally along the edge of the strap 20a as show in FIG. 2D which is between the two straps 20b. The notch 40 comprises an edge 40a which is parallel to and spaced from the edge 20c of strap 20a, and the notch 40 is also formed by a pair of edges 40b which are perpendicular to the edges 40a and 20c and which define the lateral extent of the notch. Each of the edges 40b is equidistant from the straps 20b.

A substantially identical notch 40 is provided in the edges of the four straps forming the cell, above which is the sleeve 36 shown in FIG. 2D. Thus, the cylindrical sleeve 36 is in said four rectangular notches 40 in said four straps, and substantially engages the four straps. More particularly, the outside diameter of the sleeve 36 is substantially the same as the distance between the non-facing surfaces of the straps 20b, which is the outside surfaces of the straps as shown in FIG. 2D. As a consequence, the sleeve 36 has an interference fit with the straps 20a and 20b at the notches 40 thereof. The cylindrical sleeve 36 has substantial engagement with each of the edges 40a and 40b of each of the notches, and thus the lower face 36c of the cylindrical sleeve 36 seats upon the four edges 40a of the four notches.

The sleeve 36, once positioned as shown in FIG. 2D, is welded by a weld 38 which is effected at the edges 40b of a pair of opposite straps 20a, as shown in FIG. 2B.

The welding of the four edges of the two opposite straps is usually sufficient to provide a suitable, strong weld. This weld is accomplished through laser welding techniques. However, upon inspection, if it is found that one or more of the edges 40b which have been welded are not, in fact, satisfactory, the present construction provides an assembly in which corrective action may be taken at minimal expense to avoid rejection of the assembly. Such corrective action is the welding of the four edges 40b of the opposite pair of notches of the opposite straps, in the case of FIG. 2D, this being the notches of the straps 20b.

The herein disclosed construction provides a strong assembly, and one which, if a first welding operation results in an imperfectly welded structure, permits ready corrective action to be undertaken as hereinabove explained. The notches are easily provided in the straps, during the initial manufacture of the strap from a continuous strip of metal, as by a standard punching operation. The construction is such that the notch and sleeve will have a proper fitting relationship independently of the construction of the grid, as where other aspects or portions of the grid are not in accordance with specifications. In the present construction, a further advantage is obtained in that no weld preparation is required, it being noted that the sleeves are self-locating because of the interfitting relationship with the notches in the four straps forming a particular cell. Further, due to the fact that only the edges of two opposite notches need be welded, a reduction in welding time is achieved over prior constructions. Those prior constructions, as above noted, included conventional butt joint welding, which required welding on all four straps of the cell. In addition, the present construction permits more tolerance in the alignment of the laser than in the previous butt joint construction, and, in addition, the weldin fixture required for holding the sleeve and grid in assembled relationship during the welding operation is a simpler fixture than that previously required.

In considering this invention, it should be remembered that the present disclosure is illustrative only and the scope of the invention should be determined by the appended claims.

I claim:

1. A grid and sleeve assembly comprising:
 (a) means defining a grid including a first pair of spaced, parallel grid straps extending substantially perpendicularly to a second pair of spaced parallel grid straps, the straps of each pair having the same spacing as the straps of the other pair and thereby defining at least one cell, the straps having generally straight upper edges lying substantially in a common plane;
 (b) said straps each having a rectangular notch in a said strap edge thereof located centrally along said strap edge between the straps perpendicular thereto, said notch having a generally straight edge substantially parallel to said strap edge and having a pair of edges substantially perpendicular to said strap edge; and
 (c) a cylindrical sleeve having a solid circumferential wall of generally constant inside and outside diameters, said sleeve also having a lower annular end face seated upon said edges of said notches and engaging with an interference fit each of said pairs of edges of said notches of said four straps, with said sleeves welded to a plurality of said straps at said notches.

2. The grid and sleeve assembly of claim 1, the outside diameter of said sleeve being substantially the same as the distance between the surfaces of said straps which are opposite the surfaces thereof which define the said cell.

3. The grid and sleeve assembly of claim 1, wherein said sleeve is welded to said plurality of said straps at the edges of said pair of edges of the notches of at least one said pair of straps.

* * * * *